United States Patent [19]

Buhrer

[11] Patent Number: 4,772,104
[45] Date of Patent: Sep. 20, 1988

[54] ACHROMATIC TUNER FOR BIREFRINGENT OPTICAL FILTER

[75] Inventor: Carl F. Buhrer, Framingham, Mass.

[73] Assignee: GTE Laboratories Incorporated, Waltham, Mass.

[21] Appl. No.: 83,123

[22] Filed: Aug. 10, 1987

[51] Int. Cl.⁴ .............................................. G02F 1/01
[52] U.S. Cl. ...................................... 350/403; 350/405
[58] Field of Search ................................ 350/403–405

[56] References Cited

U.S. PATENT DOCUMENTS 4,678,287  7/1987  Buhrer ................................ 350/404

OTHER PUBLICATIONS

Destriau et al., "Realisation d'un quart d'onde quasi acromatique par juxaposition de deux lames cristallines de meme nature", Jr. Phys. Radium, 2-1949, pp. 53–55.
Pancharatnam, S., "Achromatic Combinations of Birefringent Plates", Proc. Indian Academy of Sciences, 4-1955, pp. 130–136.
Koester, C. J., "Achromatic Combinations of Half-Wave Plates", Jr. Optical Soc. America, 4-1959, pp. 405–409.
Title, A. M., "Improvement of Birefringent Filters: 2: Achromatic Wave Plates", App. Optics, 1-1975, pp. 229–237.

Primary Examiner—William H. Punter
Attorney, Agent, or Firm—Fred Fisher

[57] ABSTRACT

An achromatic birefringent retardation plate has a quarter wave of linear optical birefringence over a wavelength range centered about a nominal wavelength. The plate includes a combination of two birefringent optical disks in adjacent positions along a light beam axis. Each disk has a linear optical birefringence with a fast axis. The two disks have thicknesses such that, at the nominal wavelength, they have their linear optical birefringence at n and m quarter waves, respectively of the nominal wavelength, where n is an odd integer greater than one and where m is an even integer greater than n. The fast axes of the linear birefrigences of the disks have rotational orientations about the light beam axis whereby the fast axis orientation of the other disk differs from that of one disk by ninety degrees, plus or minus one-half of the angle whose cosine is equal to the ratio of n to m.

3 Claims, 12 Drawing Sheets

ACHROMATIC TUNER FOR BIREFRINGENT OPTICAL FILTER

BACKGROUND OF THE INVENTION

1. Field of the Invention

This invention relates to an achromatic tuner for a birefringent optical filter, including an achromatic birefringent retardation plate therefor. Accordingly, it is a general object of this invention to provide new and improved tuners and filters therefor.

2. General Background

Optical frequency or wavelength selective filters with exacting bandpass characteristics have been used in the past for the isolation of spectral lines. As the optical spectrum is used to an increasing extent for communications channels, such filters are being adapted for the separation of optical signals from a single transmission medium such as optical fiber. Birefringent optical filters are capable of such exacting separation of signals having closely spaced wavelengths, and their designs have progressed to allow the realization of any desired periodic transmission function as well as the simple sinusoidal response obtainable with a single birefringent crystal element located between polarizers. The theory and art of such birefringent optical filters have been reviewed in some detail by A. M. Title and W. J. Rosenberg in their article, "Tunable Birefringent Filters", Optical Engineering, 20(6), pp. 815–823, (1981).

Of particular interest is the Solc-type filter configuration in which a lossless sequence of birefringent crystal elements is located between input and output polarizers. The number and orientation angles of these elements may be chosen to synthesize any periodic filter transmission versus optical frequency characteristic, and by replacing the polarizers with polarizing beam splitters, there is obtained an optical multiplexer/demultiplexer device with this transfer function and its complement as its operating characteristic.

My U.S. patent, "Methods of and Apparatus for Tuning a Birefringent Optical Filter", U.S. Pat. No. 4,678,287, issued July 7, 1987, assigned to the common assignee of this application, describes several configurations of quarter-wave plates that, when used in conjunction with two birefringent crystal elements of such a lossless Solc-type birefringent filter, permit the simultaneous and equal tuning of these two elements by rotating a single contiguous group of optical components. When all birefringent crystal elements of the filter are so tuned in synchronism to effectively add to or subtract from the birefringence of each component element equally, the periodic transmission function becomes shifted without distortion in the optical frequency domain.

Quarter-wave plates are the essential components of the two plate tuners used to tune the birefringent crystal elements. A relative rotation between the plates gives both the desired tuning effect to the associated birefringent crystal element and an undesired rotational reorientation between opposite ends of the optical system where the input and output polarizers or polarizing beam splitters are located. The latter can be eliminated by configuring a pair of two plate tuners in a complementary manner so that equal and opposite relative rotations between their component quarter-wave plates give equal additions to the birefringence of their associated crystal element. No net rotational reorientation between the optical system input and output remains when such complementary pairs of two plate tuners are used. This is particularly desirable when polarizing beam splitters are being used to implement multiplexer devices.

Ideal quarter-wave plates propagate unchanged two components of plane polarized light, one with its electric field along the fast axis of the plate, and the other with its electric field along the slow axis of the plate. Upon passing through the plate, the two waves undergo a differential phase shift of ninety degrees such that the light polarized along the fast axis is phase advanced relative to the light polarized along the slow axis. Practical quarter-wave plates can consist of a uniaxially stressed thin film of certain plastics such as polyvinyl alcohol, or preferably can be optically polished thin parallel plates or disks cut from a birefringent crystal such as quartz. Their thickness is chosen to give the desired ninety degree phase shift between the ordinary and extra-ordinary polarization components.

Optical filtering devices, designed to operate over a wavelength range about a nominal center wavelength, include components such as polarizers, polarizing beam splitters, and especially quarter-wave plates used for tuning that should perform well over the wavelength range. For example, a quartz wave plate 38.23 microns thick and cut such that the optic axis is perpendicular to the plate normal, has a nominal phase retardation of ninety degrees at 1.315 microns. When it is used in tuning a birefringent filter operating in the 1.28 to 1.35 micron range, its retardation at these limiting wavelengths is of interest because it affects both the performance of the tuner and that of the filter. The retardation, in degrees, for a uniaxial positive crystal such as quartz is given by the formula $$\delta = 360 t (n_e - n_o)/\lambda_o$$

where t is the plate thickness in microns, $\lambda_o$ is the nominal center wavelength in microns, and $n_o$ and $n_e$ are the ordinary and extra-ordinary refractive indices. At 1.28 and 1.35 microns, the retardation is 92.68 and 87.46 degrees, respectively. This deviation from 90 degrees is small in the wavelength range of interest, but can result in a noticeable degradation in the birefringent filter performance when several such quarter-wave plates are used in a multielement filter design.

A quarter-wave plate, as heretofore described, is known as a first order plate. Its fabrication from a quartz crystal disk is difficult due to its thinness and fragility. Other crystals with a smaller birefringence may be preferable, but none with the optical quality of quartz is presently readily available. Quartz retardation plates are produced according to the prior art in two ways. In one, the disk is made some odd multiple n of the above thickness to yield a high order plate of n quarter waves. At its design center wavelength of 1.315 microns, for example, it has a retardation of 90 n degrees, which is equivalent to a quarter-wave plate when n=1,5,9,13, etc. and to a reversed (fast and slow axes reversed) quarter-wave plate when n=3,7,11, etc. As the wavelength deviates from the design center, the plate retardation changes from quarter-wave at a rate n times as fast as that of a first order quarter-wave plate. Disadvantageously, this type of plate is unsatisfactory for constructing tuners for birefringent filters. In the other method of the prior art, a composite plate is constructed of two parallel quartz disks in which the retardation values differ by ninety degrees. Each is oriented with its optic axis perpendicular to the common plate normal and to the optic axis of the other disk so that the birefringence effects of each partially cancel one another. The net retardation is ninety degrees, and, because the retardation changes with wavelength at the same rate as a first order plate, the composite is termed a pseudo first order quarter-wave plate.

The combination of simple wave plates to form achromatic wave plates, usually with the goal of achieving quarter- or half-wave plate qualities over the visible spectrum, has been described in the prior art. These so-called combination wave plates were described by G. Destriau and J. Prouteau (J. Phys. Radium, Ser. 8, Vol. 10, p. 53, 1949). Further work was done by S. Pancharatnam (Proc. Indian Acad. Sci., A41, 137, 1955). Their development for the tuning of birefringent filters was continued by A. M. Title (Applied Optics, 14(1), 229, Jan. 1975). The achromatic birefringence obtained is often accompanied by a nonzero optical rotatory effect which is expected on the basis of a theorem proven by R. C. Jones who showed that for a given wavelength any combination of retardation plates is equivalent to, at most, a linear retardation and a rotation (J. Optical Soc. Amer., 31, p. 493, 1941). Usually, three or more plates should be combined if the resulting achromatic combination is to be free of this equivalent rotation component.

The requisite first order plates from which such composite achromatic quarter-wave plates could be made would themselves need to be composite pseudo first order plates if they are to be made from a birefringent crystalline material such as quartz.

SUMMARY OF THE INVENTION

Another object of the invention is to provide a new and improved achromatic combination quarter-wave plate for a birefringent optical filter which directly combines two high order retardation disks to yield a quarter wave of retardation achromatic over a wavelength range about some nominal center wavelength.

Still another object of the invention is to provide a new and improved achromatic tuner for a birefringent optical filter which combines two resulting achromatic combination quarter-wave plates, which each include a nonzero and nonachromatic rotation component, to provide an achromatic two plate tuner useful for tuning birefringent filters.

In accordance with one aspect of the invention, an achromatic birefringent retardation plate has a quarter wave of linear optical birefringence over a wavelength range centered about a nominal wavelength. The plate includes a combination of two birefringent optical disks in adjacent positions along a light beam axis. Each disk has a linear optical birefringence with a respective fast axis. The disks have such thicknesses that, at the nominal wavelength, one disk has its linear optical birefringence at n quarter waves (of the nominal wavelength), where n is an odd integer greater than one; the other disk has its linear optical birefringence at m quarter waves, where m is an even integer greater than n. The fast axes of the linear birefringences of the disks have rotational orientations about the light beam axis such that orientation of the fast axis of the other disk differs from orientation of the fast axis of the one disk by ninety degrees plus or minus one-half of the angle whose cosine is equal to the ratio of n to m. In accordance with certain features, the achromatic birefringent retardation plate has a wavelength dependent circular optical birefringence or rotation effect. Circular optical birefringence is the specific type of birefringence which is the physical origin of the optical rotation effect. The word "or" is meant to indicate that both phrases "circular optical birefringence" and "rotation effect" are two terms specifying the same physical phenomenon.

In accordance with another aspect of the invention, a two plate tuner is achromatic over a wavelength range centered about a nominal wavelength. Two achromatic quarter-wave composite plates provide a variable linear birefringent effect in response to their angular orientation about a light beam axis. Each plate includes a pair of birefringent optical disks, the plates being in serially adjacent positions along the light beam axis. One disk from one plate and one disk from the other plate have a thickness such that, at the nominal wavelength, they have linear optical birefringence at n quarter waves of the nominal wavelength, where n is an odd integer greater than one. The other disks from the two plates have a thickness such that, at the nominal wavelength, they have linear optical birefringences at m quarter waves of the nominal wavelength, where m is an even integer greater than n. Each disk has a respective linear optical birefringence with a respective fast axis. The fast axes of the linear optical birefringence of the four disks have rotational orientation about the light beam axis such that the fast axis orientations of the foregoing one disks differ from the fast axis orientations of the other disks, respectively, by a constant angle equal to ninety degrees plus or minus one-half of the angle whose cosine is equal to the ratio of n to m.

BRIEF DESCRIPTION OF THE DRAWING

Other objects, advantages, and features of this invention, together with its construction and mode of operation, will become more apparent from the following description, when read in conjunction with the accompanying drawing, in which:

FIG. 7 is a chart showing a calculated $\alpha$ and $\beta$ as a function of normalized wavelength;

DESCRIPTION OF PREFERRED EMBODIMENT(S)

Figure 1:
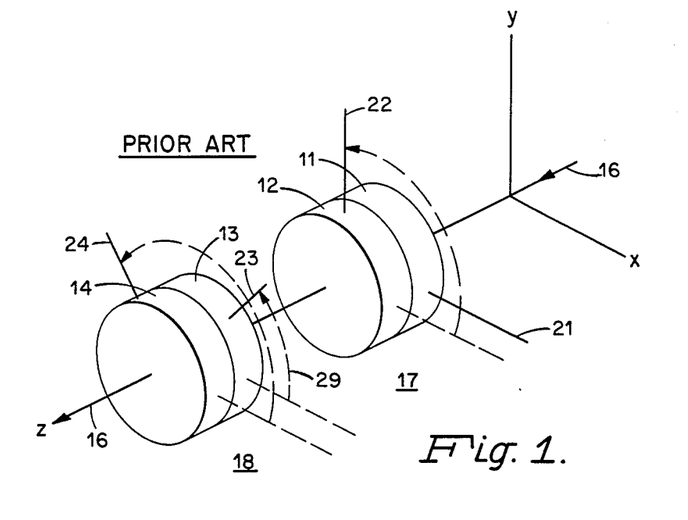
FIG. 1 is a diagram of two pseudo first order wave plates configured as an achromatic quarter-wave combination plate according to the prior art.

Two pseudo first order wave plates 17, 18, constructed according to the prior art, are shown in FIG. 1. Optically polished flat circular disks 11, 12, 13, 14 are made from a birefringent crystal, such as quartz, cut such that the optic axis of the crystal is perpendicular to the optical beam axis 16 which is also normal to the faces of all the disks 11, 12, 13, 14. Fast axes 22, 24 are rotationally oriented so as to be 90 degrees from fast axes 21, 23, respectively. For a uniaxial positive crystal such as quartz in which the extra-ordinary index $n_e$ is greater than the ordinary refractive index $n_o$, these fast axes are located 90 degrees from the crystal symmetry axis which is the slow axis. Disks 11, 12 of pseudo first order quarter-wave plate 17 have a thickness difference of t chosen to give at some nominal wavelength a birefringent phase retardation of 90 degrees by the following formula:

$$t = \frac{\lambda_o}{4(n_e - n_o)}$$

For example, when the disk 11 has a thickness of qt, the disk 12 has a thickness of (q−1)t when 21 is to be the fast axis of the pseudo first order quarter-wave plate 17. When the disk 13 has a thickness of rt then the disk 14 has a thickness of (r−2)t when 23 is to be the fast axis of the pseudo first order half-wave plate 18. Constants q and r need not be integers.

FIG. 1 is also configured according to the prior art of making an achromatic quarter-wave combination plate. Accordingly, the fast axis 23 of the pseudo first order half-wave plate 18 is rotationally oriented at an angle 29 relative to the fast axis 21 of the pseudo first order quarter-wave plate 17 where angle 29 has a value a of 60 degrees. As measured from the x coordinate axis, the fast axes 21, 22, 23, 24 are therefore at angles of 0, 90, 60, and 150 degrees. This combination, as well as the related configuration with the fast axis 23 of the pseudo first order half-wave plate 18 at a relative angle a of 120 degrees (equivalent to −60 degrees) from the fast axis 21 of the pseudo first order quarter-wave plate 17, provides an achromatic 90 degrees of retardation about the nominal wavelength used in the above formula for choosing the disk thicknesses. However, nonachromatic rotation is associated with the retardation.

Figure 2:
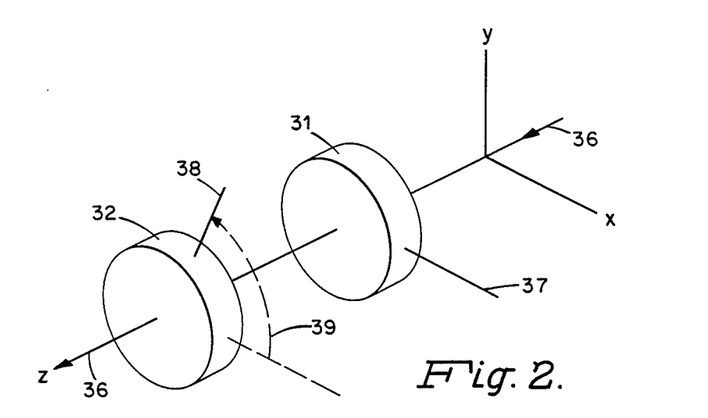
FIG. 2 is a view of an achromatic quarter-wave combination plate in accordance with the invention.

The basic achromatic quarter-wave combination plate of the present invention is depicted in FIG. 2. Optically polished circular disks 31, 32 are made from a birefringent crystal, such as quartz, cut such that the optic axis of the crystal is perpendicular to the optical beam axis 36 which is also normal to the faces of both disks 31, 32. The disk 31 has a thickness nt that is an odd integral multiple of the above defined quarter-wave thickness t, while the disk 32 has a thickness of mt that is an even integral multiple of t, and m is greater than n. When n=1 and m=2, the disks 31, 32 are quarter- and half-wave plates, and the relative angle a between the fast axis 38 of the disk 32 and the fast axis 37 of the disk 31 is chosen to have a value of a equals 60 or 120 degrees, according to the prior art, to provide an achromatic composite plate with a quarter wave of birefringence. But, according to the present invention m>n>1 and $$a = 90 \pm 0.5 \cos^{-1}(n/m).$$

Selection of larger odd and even integers for n and m, respectively, permits the fabrication of thicker disks 31, 32 from birefringent crystalline materials such as quartz in the same manner as the halves of pseudo first order plates are made. When combined, as in the present invention, the 90 degrees of birefringence obtained varies less as a function of wavelength than the birefringence of a pseudo first order quarter-wave plate, but more than that of an achromatic composite plate constructed according to the prior art with n=1 and m=2. The wavelength range within which the composite plate retains a given degree of achromaticity decreases with increasing n and m, and so the preferred value for n is the smallest odd integer consistent with the practical fabrication and handling of the crystalline disk, and the preferred value for m is n+1. Accompanying the retardation, as in the prior art, is a nonachromatic rotatory effect which can be accommodated when applying these composite plates to the tuning of birefringent filters.

Two methods have been used to analyze the optical properties of these composite plates. One is the concept of the Poincare sphere, a geometric representation of all possible polarization states as points on a spherical surface, and of the transformations produced by optical retardations and rotations by circular paths about equatorial and polar axes, respectively. The second is the matrix method of R. C. Jones, presented in "A New Calculus for the Treatment of Optical Systems", (J. Optical Soc. Amer., 31, p. 488, 1941). The Poincare sphere is helpful in visualizing the polarization transformations involved, and in selecting the configuration required, while the Jones matrices serve as the basis for the computations that may be used to quantify the performance of the resulting design.

Figure 3A:
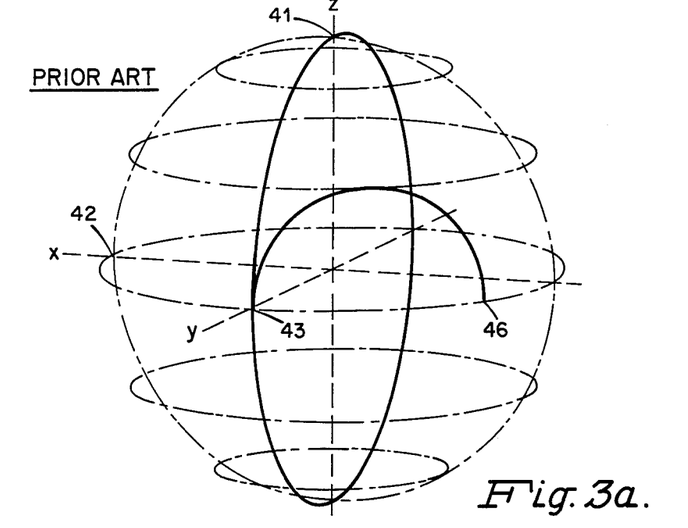
FIG. 3a is a perspective view of the Poincare sphere representation of the prior art depicted in FIG. 1.

The theorem of Jones states that at a given wavelength any combination plate is equivalent to, at most, one retardation plate and one optical rotator. If it can be shown by means of the Poincare sphere analysis that a combination plate will transform a circularly polarized input wave to a linearly polarized output, it follows that the equivalent retardation value is 90 degrees, since the associated rotator can only change the azimuth of this linear polarization. The Poincare sphere representation of the polarization transformations taking place in the prior art achromatic quarter-wave combination plate of FIG. 1 is the same as in that of FIG. 2 when the disks 31, 32 are made true first order quarter and half-wave plates, respectively, by choosing n=1 and m=2, and when the relative angle 39 between the fast axis 38 of the half-wave plate 32 and the fast axis 37 of the quarter-wave plate 31 is a=60 degrees. In the perspective view of the Poincare sphere shown in FIG. 3a, the north pole point 41 (as viewed) represents a right circularly polarized input light wave. The 90 degree arc 41 to 43 about the x axis represents the transformation by the first order quarter-wave plate to linear polarization with an azimuth of 45 degrees, while the 180 degree arc 43 to 46 represents the transformation by the half-wave plate to linear polarization with an azimuth of 75 degrees. Note that the spherical coordinates are twice $\psi$ and $x$, the azimuth and ellipticity of the represented polarization state.

Figure 3B:
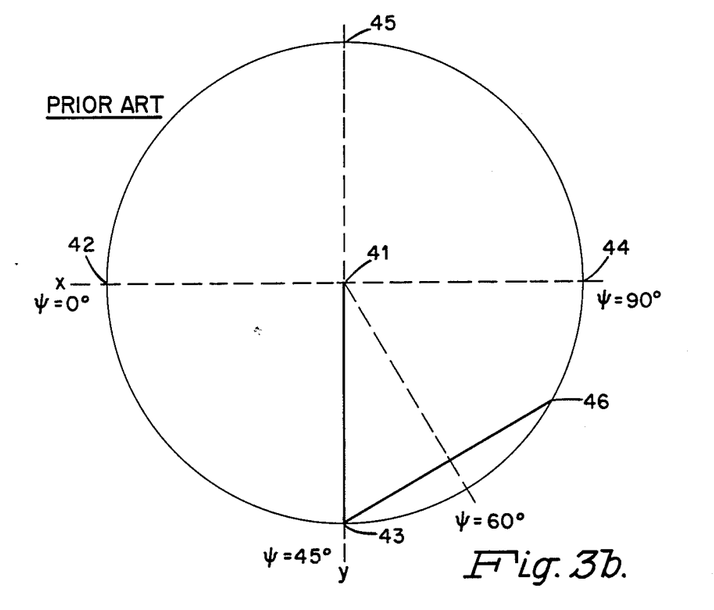
FIG. 3b is a view of FIG. 3a taken along the polar z axis.

FIG. 3b shows the foregoing construction as viewed from along the polar z axis. The quarter-wave plate has its fast axis at an angle $\psi = 0$ degrees, and the polarization transformation in it is represented by the clockwise rotation about $\psi = 0$ from point 41 to point 43. Similarly, the half-wave plate has its fast axis at an angle $\psi = 60$ degrees, and the polarization transformation in it is represented by the clockwise rotation about $\psi = 60$ degrees from point 43 to point 46. The composite plate is achromatic when the points 41 and 46, representing the input and output polarization states, remain invariant as the wavelength deviates from the nominal center wavelength used in computing the quarter-wave thickness t. This is the case when both arcs change length at the same rate at the point 43 of tangency. Since wavelength variations produce the same fractional angular change in both arcs, the condition for achromatic compensation of the combination plate is that the arc radii be inversely proportional to their angular length. Thus, for this case of $n = 1$ and $m = 2$, the diameter between points 43 and 46 should be one-half the diameter between points 43 and 45, and this requires that the fast axis of half-wave plate 32 be at $\psi = 60$ degrees as shown by M. G. Destriau and M. J. Prouteau, supra.

Figure 4A:
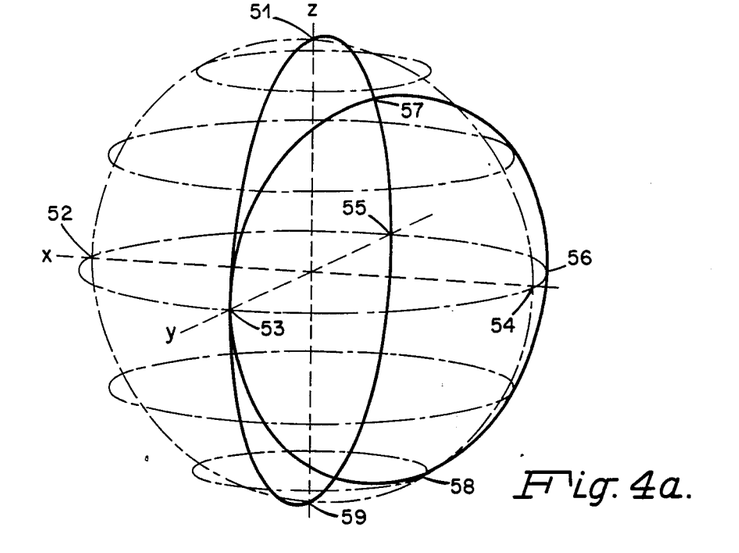
FIGS. 4a and 4b are Poincare sphere representations of the polarization transformations of the invention depicted in FIG. 2.
Figure 4B:
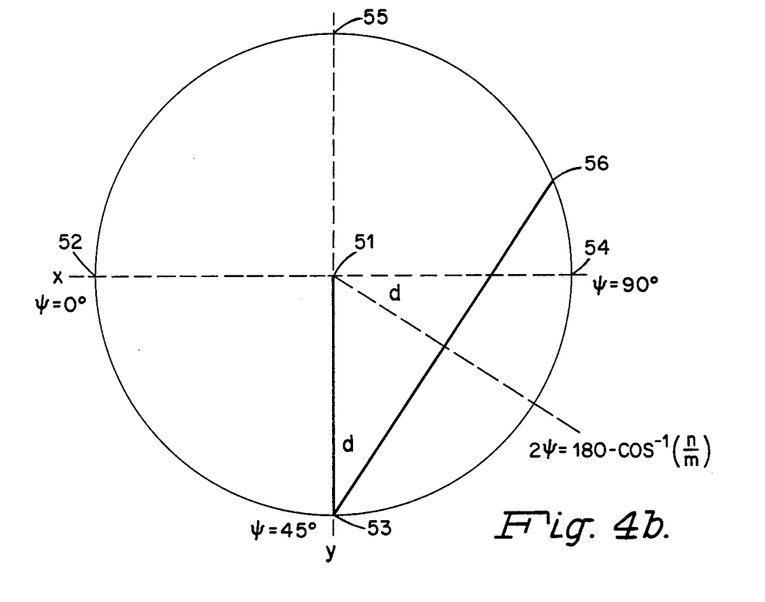

FIGS. 4a and 4b show a perspective view and a view from along the polar z axis, respectively, of the Poincare sphere representations of the polarization transformations of the present invention as depicted in FIG. 2, in which n is an odd integer greater than one and m is an even integer greater than n. The case shown is where $n = 5$ and $m = 6$. The transformation of a right circularly polarized input wave by the odd order disk 31 with 5 quarter waves of retardation is represented by the 450 degree arc from point 51 through points 53, 59, 55, and 51 to point 53. The further transformation by the even order disk 32 with 6 quarter waves of retardation is represented by the 540 degree arc from point 53 through points 57, 56, 58, 53, and 57 to point 56. This combination plate is achromatic when the diameter between points 53 and 56 is 5/6 of that between points 53 and 55. In the more general case $(n/m) = \cos d$, where d represents the angle between these diameters, and the required relative orientation a of the fast axis of the disk 32 is given by the formula stated above. The alternative value of a greater than 90 degrees corresponds to the smaller radius circular arc lying on the opposite Poincare hemisphere. Combination plates with other n and m values are analyzed similarly. When $n = 3, 7, 11, 15, 19$, etc., the arc representing the disk 31 ends at point 55, and the smaller radius arc which may lie in either hemisphere is tangent at that point. When $m = 4, 8, 12, 16, 20$, etc., this smaller radius arc ends at its starting point of tangency. The azimuth of the resulting linear polarization state therefore depends upon the specific n and m values chosen.

The Jones matrix method of analysis will now be used to compute the equivalent birefringence and rotatory effect of the combination plates constructed as defined above. According to the above theorem of Jones, a single rotator suffices, but an alternative equivalence is one in which the retardation has its fast axis fixed at zero degrees and is both preceded and followed by a rotator. The Jones matrix product for this sequence of elements is:

$$M = \begin{pmatrix} \cos\beta & -\sin\beta \\ \sin\beta & \cos\beta \end{pmatrix} \begin{pmatrix} \exp(j\delta/2) & 0 \\ 0 & \exp(-j\delta/2) \end{pmatrix} \begin{pmatrix} \cos\alpha & -\sin\alpha \\ \sin\alpha & \cos\alpha \end{pmatrix}$$

where $\alpha$ and $\beta$ are the angular rotations in radians before and after the $\delta$ radians of retardation. The achromatic combination plate shown in FIG. 2 is constructed of two high order retarders, each with its fast axis at an angle $\theta$ and with a retardation $\Gamma$ given by the following formula:

$$\Gamma = 90 \, n\lambda_o/\lambda$$

where n (or m) is as defined above and $\lambda$ and $\lambda_o$ are the actual and nominal center wavelengths respectively. The Jones matrix M of each of these is that of a retarder with $\delta = \Gamma$, transformed by rotations of $-\alpha = \beta = \theta$, or:

$$M = \begin{pmatrix} \cos\theta & -\sin\theta \\ \sin\theta & \cos\theta \end{pmatrix} \begin{pmatrix} \exp(j\Gamma/2) & 0 \\ 0 & \exp(-j\Gamma/2) \end{pmatrix} \begin{pmatrix} \cos\theta & \sin\theta \\ -\sin\theta & \cos\theta \end{pmatrix}.$$

The Jones matrix of the combination plate is computed by matrix multiplication and, by equating the elements of the resulting matrix with those of the Jones matrix of the equivalent rotator, retarder, rotator, it is possible to solve for $\alpha$, $\beta$, and $\delta$ by using the following equations:

$$\tan(\alpha + \beta) = (-\text{real } M_{12})/(\text{real } M_{11})$$

$$\tan(\alpha - \beta) = (-\text{imag } M_{12})/(\text{imag } M_{11})$$

$$\tan\left(\frac{\delta}{2}\right) \cdot \frac{\cos(\alpha - \beta)}{\cos(\alpha + \beta)} = (\text{imag } M_{11})/(\text{real } M_{11})$$

Figure 5:
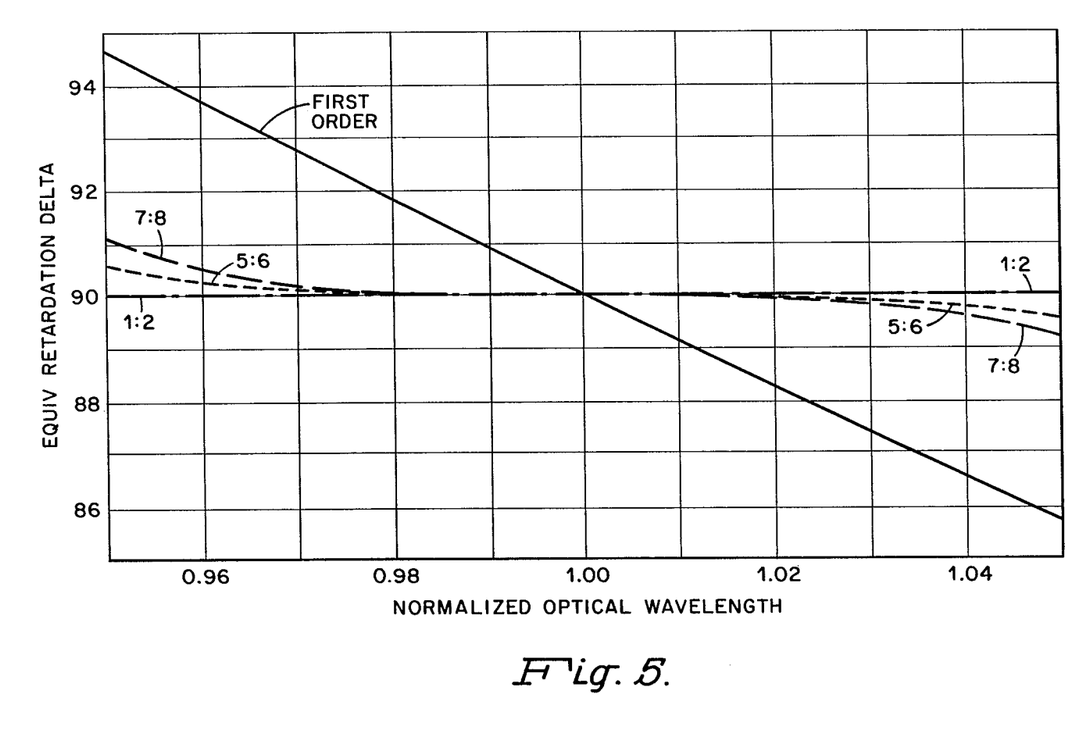
FIG. 5 is a graph of the equivalent $\delta$ value for the combination plate of FIG. 2 as a function of the normalized wavelength $\lambda/\lambda_o$.
Figure 6:
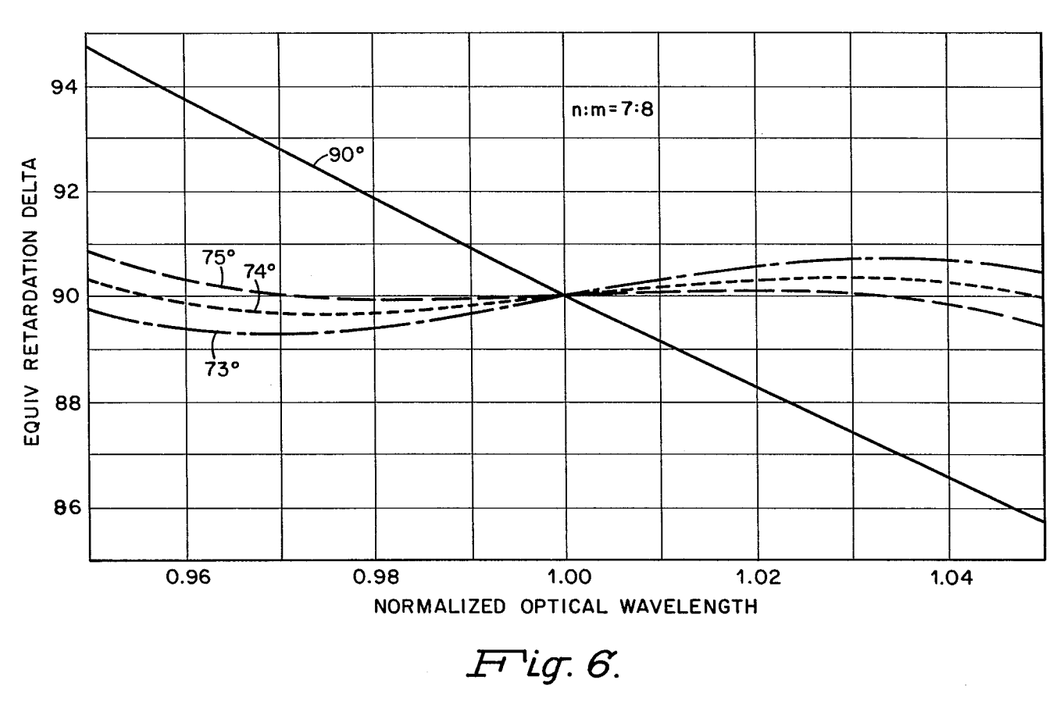
FIG. 6 is a graph of the equivalent $\delta$ value for the combination plate of FIG. 2 as a function of the normalized wavelength $\lambda/\lambda_o$, replotted for an $n=7$, $m=8$ combination.

FIG. 5 is a plot of the equivalent $\delta$ value for the combination plate of FIG. 2 as a function of the normalized wavelength $\lambda/\lambda_o$. Curves for disk thickness combinations $n:m = 1:2, 5:6$ and $7:8$ are shown. Each was computed using the value a calculated as described above for the relative angle 39. Also shown for comparison is the retardation versus wavelength curve of a pseudo first order quarter-wave plate. It can be seen that, over the limited plus and minus five percent bandwidth being considered, the $n = 1, m = 2$ combination of the prior art provides almost exactly 90 degrees of retardation, but all the higher order achromatic combination plates of the present invention remain significantly closer to 90 degrees than does a real or pseudo first order plate. For the intended application in tuning birefringent filters useful for communication systems the required bandwidth is only a few percent, and any of the higher order combinations shown is satisfactory and superior to a pseudo first order plate of similar complexity. In FIG. 6, the result for the n:m=7:8 combination is replotted for the combination plate of FIG. 2 with the relative angle 39 decreased slightly from the achromatic value of a=75.5225 degrees to 75, 74, and 73 degrees to illustrate that it is possible to trade off tolerance in retardation for increased bandwidth. A similar result was found previously by M. Destriau and J. Prouteau, supra, for the n=1, m=2 combination. The retardation of the pseudo quarter-wave plate obtained when a=90 degrees is shown for comparison.

Figure 8:
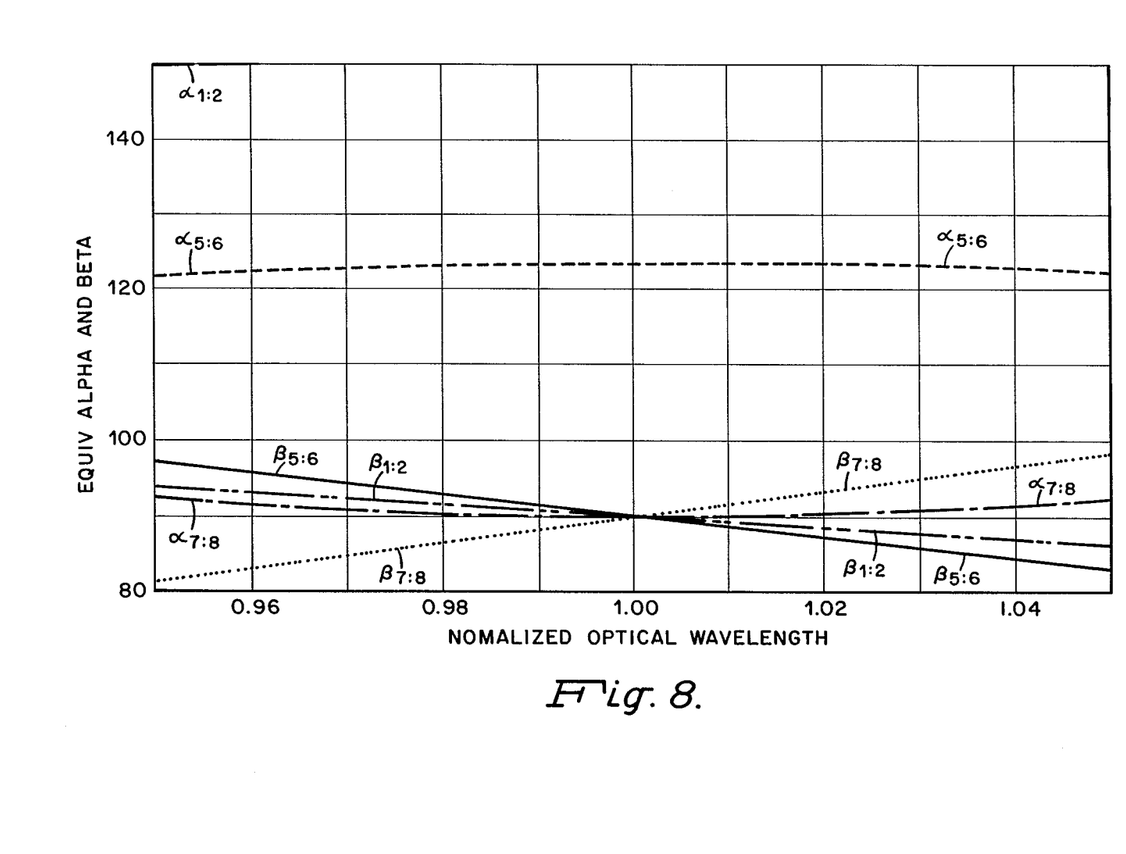
FIG. 8 is a chart, similar to FIG. 7, but with the sequence of disks along the optical beam axis reversed.

The two equivalent rotators with angles of $\alpha$ and $\beta$ accompany the equivalent achromatic retardation having its fast axis at zero degrees. In the configuration of FIG. 2, the fast axis 37 of the odd order disk 31 is at zero degrees, and the fast axis 38 of the even order disk 32 is at a relative angle a=90−0.5 cos$^{-1}$ (n/m). The calculated $\alpha$ and $\beta$ are shown in FIG. 7 as a function of normalized wavelength for n:m=1:2 and for high order plate combinations n:m=5:6 and 7:8. $\alpha$, the equivalent rotation on the odd order input side of the combination plate, is 90 degrees at the nominal center and varies linearly as a function of wavelength. $\beta$, the equivalent rotation on the even order output side of the combination plate, depends on the specific n and m values and has only a small second order variation with wavelength about the nominal center. When the sequence of disks along the optical beam axis is reversed, a similar calculation results (FIG. 8) wherein $\alpha$ becomes the equivalent rotation on the even order input side of the combination plate and has only a second order variation with wavelength, while $\beta$, the equivalent rotation on the odd order output side, forms an angle of 90 degrees at the nominal center and varies linearly as a function of wavelength. This linear variation, however, has a slope opposite that of $\alpha$ for the original disk sequence. These results suggest that when an adjacent pair of two quarter-wave achromatic plates are required, the accompanying rotations that are a linear function of wavelength be cancelled by suitably sequencing the disks comprising the achromatic combination plates to bring these equivalent rotations together so that they sum to a constant 180 degrees. The effect of reversing the sequence of the odd and even order disks is to convert from the configuration of FIG. 2 to its mirror image. It is also equivalent to the configuration of FIG. 2 in which the fast axis 37 of the odd order disk 31 is at zero degrees, but the fast axis 38 of the even order disk 32 is at the alternative relative angle a=90+0.5 cos$^{-1}$ (n/m). Since these two configurations have opposite symmetry and wavelength variations of their equivalent rotation effects, they may often be used together, particularly with the odd order disk sides facing each other so that the larger linear variations of equivalent rotation effect cancel. The configurations of FIGS. 9a and 9b, for example, are complementary two plate tuners for a birefringent filter, each quarter-wave plate including an achromatic combination of odd and even high order retardation disks with the odd order disks facing one another.

Figure 9A:
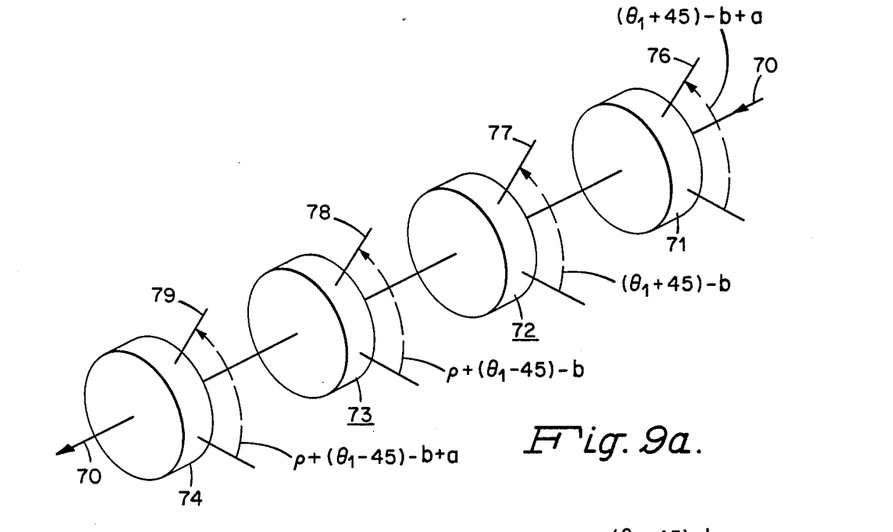
FIGS. 9a and 9b are schematic diagrams of complementary two plate tuners for a birefringent filter, in accordance with an aspect of the invention.
Figure 9B:
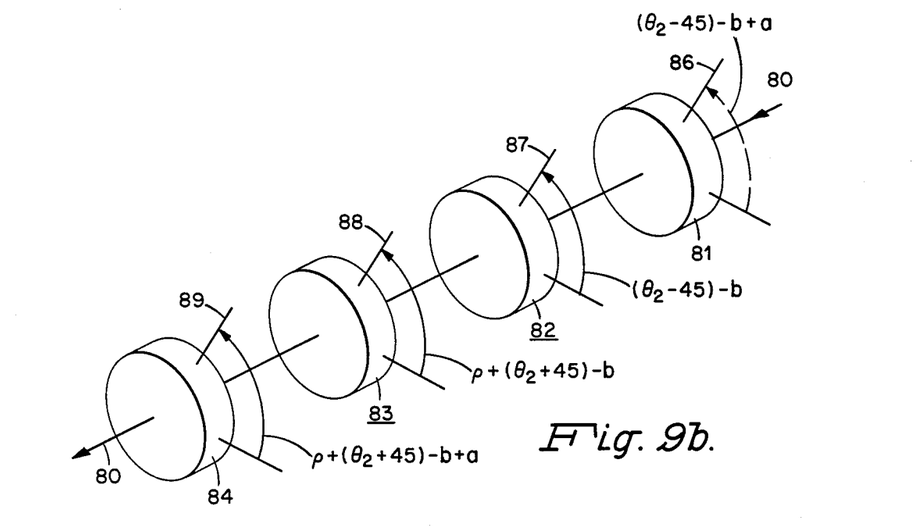

The configuration depicted in FIG. 9a provides a variable retardation effect of $\delta = +2\rho$ with its fast axis at an angle $\theta_1$, while the configuration depicted in FIG. 9b provides an effect of $\delta = 2\rho$ with its fast axis at an angle $\theta_2$. Odd order optically polished flat circular disks 72 and 73 are positioned between even order disks 71 and 74 along a beam axis 70 of FIG. 9a, and odd order disks 82 and 83 are similarly positioned between even order disks 81 and 84 along a beam axis 80 of FIG. 9b. Fast axes 76, 77, 78, 79, 86, 87, 88, and 89 of each disk are rotationally oriented relative to the x coordinate axis which serves as the zero degree reference. The formulas specifying the orientation angles are derived from the design of the complementary pair of two quarter-wave plate tuners described in U.S. Pat. No. 4,678,287, cited above. In lieu of each quarter-wave plate there is an achromatic combination of two high order retardation disks, but, further, to the angular orientation of the fast axis of each disk there is added a correction angle b to accommodate the equivalent rotator effect accompanying the birefringent effect. Further, to the angle of each even order disk there is added the relative angle a of the achromatic combination plate.

In terms of the quarter-wave thickness t defined above, each of the odd order disks has a thickness of nt, where n is an odd integer greater than one, and each of the even order disks has a thickness of mt, where m is an even integer greater than n. Relative angle a is equal to 90−c, where c=0.5 cos$^{-1}$ (n/m). Correction angle b is the sum of 0 when n=5, 9, 13, 17, etc. or 90 when n=3, 7, 11, 15, etc. and 0 when m=4, 8, 12, 16, etc. or 90−2C when m=6, 10, 14, 18, etc. The required angular orientations are summarized in the following Table 1.

TABLE 1

| Positive Polarity<br>Tuner ($\delta = +2\rho$) | Negative Polarity<br>Tuner ($\delta = -2\rho$) |
| --- | --- |
| Even disk 71 ($\theta_1$ + 45) − b + $\psi$a | Even disk 81 ($\theta_2$ − 45) − b + $\psi$a |
| Odd disk 72 ($\theta_1$ + 45) − b | Odd disk 82 ($\theta_2$ − 45) − b |
| Odd disk 73 $\rho$ + ($\theta_1$ − 45) − b | Odd disk 83 $\rho$ + ($\theta_2$ = 45) − b |
| Even disk 74 $\rho$ + ($\theta_1$ − 45) − b + $\psi$a | Even disk 84 $\rho$ + ($\theta_2$ + 45) − b + $\psi$a |

As described in U.S. Pat. No. 4,678,287, cited above, each of the complementary pair of two plate tuners provides the desired tunable birefringence effect, but it is accompanied by a coordinate transformation to an output set of axes rotationally displaced from an input set of axes by an angle $\rho$. This is equivalent to an optical rotation of $-\rho$. Such is the case also in the present configuration where each of the two quarter-wave plates consists of two high order retardation disks. The tuners depicted in FIGS. 9a and 9b are, therefore, most advantageously used together as a complementary pair as described in U.S. Pat. No. 4,678,287 and preferably in the configuration shown in FIG. 10. Between two equal length crystal elements 62 and 63 of a lossless Solc type birefringent filter are the eight retardation disks. The four central disks 73, 74, 81, 82 are rotated as a group through a tuning angle $\rho$, while the outer disks 71, 72, 83, 84 remain fixed in their angular orientations. The fast axes 67, 68 of the crystal elements 62, 63 are oriented at $\theta_1$ and $\theta_2$, respectively, and these angles are determined according to the prior art by which the desired transmission versus wavelength filtering characteristic may be synthesized. Adjacent to each element are the four retardation disks comprising the two plate tuner that tunes that element. They provide an equivalent tuned retardation effect $\delta = 2\rho$ with fast axes parallel to the fast axis of their adjacent tuned crystal element. This equal polarity tuning is achieved by adding the tuning angle $\rho$ to the disks 81, 82 rather than to the disks 83, 84. Further, no accompanying rotational effects remain other than the small second order effects of the achromatic combination plates. The required angular orientations of the fast axes of the crystals and of the high order retardation disks are summarized in the following Table 2.

TABLE 2

Dual Tuner for Two Birefringent Crystal Elements ( =+2 )

Figure 10:
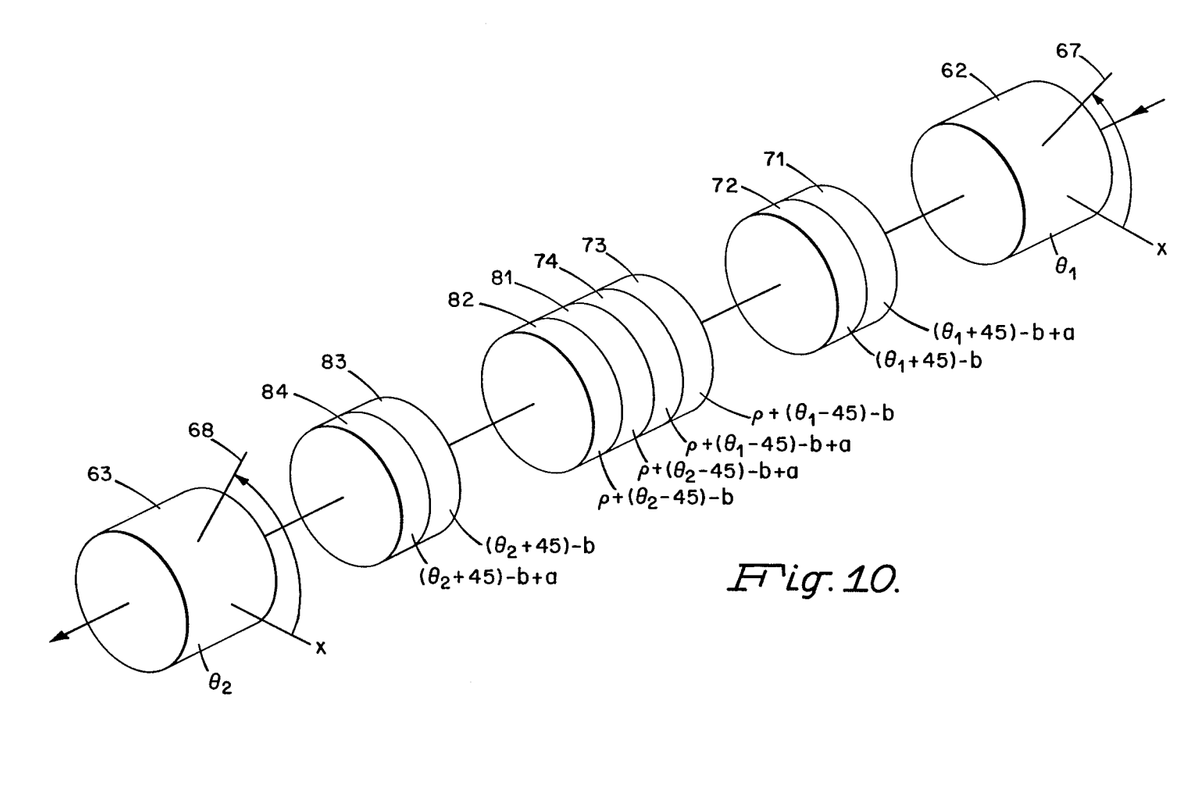
FIG. 10 shows the tuners of FIGS. 9a and 9b in a preferred configuration.
Figure 11A:
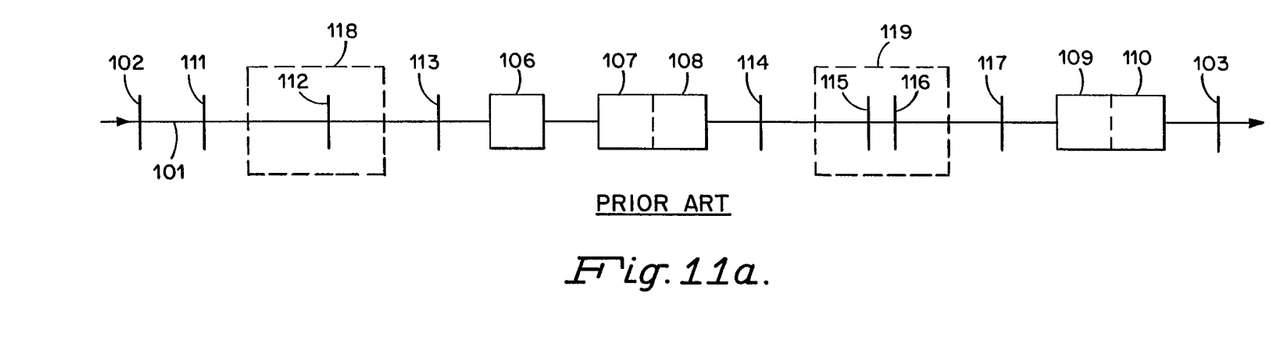
FIG. 11a is a diagram of a tuned five birefringent crystal element filter for use as a wavelength multiplexer, utilizing retardation plates of the prior art.
Figure 11B:
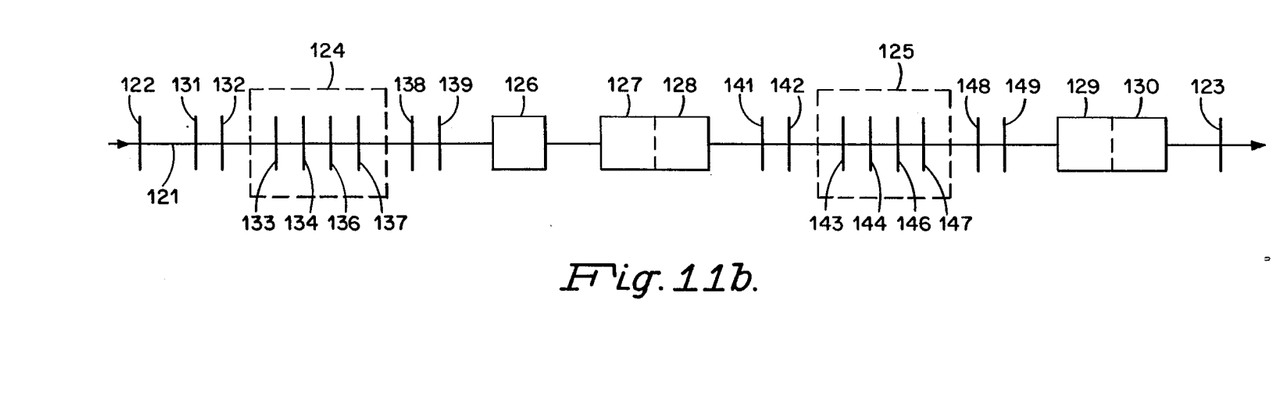
FIG. 11b is a diagram of a tuned five birefringent crystal element filter for use as a wavelength multiplexer utilizing achromatic combinations of high order retardation disks according to the present invention.

Crystal element 62 $\theta_1$
Even order disk 71 $(\theta_1 + 45) - b + \psi a$
Odd order disk 72 $(\theta_1 + 45) - b$
Odd order disk 73 $\rho + (\theta_1 - 45) - b$
Even order disk 74 $\rho + (\theta_1 - 45) - b + \psi a$
Even order disk 81 $\rho + (\theta_2 - 45) - b + \psi a$
Odd order disk 82 $\rho + (\theta_2 - 45) - b$
Odd order disk 83 $(\theta_2 + 45) - b$
Even order disk 84 $(\theta_2 + 45) - b + \psi a$
Crystal element 63 $\theta_2$ FIG. 11a represents a tuned five birefringent crystal element filter designed to serve as the basis for a wavelength multiplexer device. A light beam 101, traveling from left to right, passes through polarizers 102, 103 between which are located one 5000 micron thick quartz crystal 106 and two double length quartz crystals of which halves 107, 108, 109, 110 are also 5000 microns thick. Also along the beam 101 are the wave plate tuners consisting of half-wave plate 112 and quarter-wave plates 111, 113, 114, 115, 116, 117. The orientation angles of these components are listed in Table 3. As described in U.S. Pat. No. 4,678,287, the theoretical transmission characteristics of this filter are plotted there for various tuning angles assuming that each of the quarter- and half-wave plates has the ideal retardation values of 90 or 180 degrees. In FIG. 11b the ideal retardation plates are replaced by achromatic combinations of high order retardation disks according to the present invention. Along light beam 121 between polarizers 122, 123 are located one 5000 micron thick quartz crystal 126 and two double length quartz crystals of which halves 127, 128, 129, 130 are also 5000 microns thick. Also along the beam are the wave plate tuners consisting of eight high order retardation disks 131, 132, 133, 134, 136, 137, 138, and 139 configured as shown in FIG. 10 with $\theta_1 = \theta_2 = +45$ degrees, the fast axis orientation of birefringent element 126, while the eight disks 141, 142, 143, 144, 146, 147, 148, and 149 are similarly configured as shown in FIG. 10 with $\theta_1 = -15$ degrees, the fast axis orientation of birefringent crystal element halves 127 and 128 and with $\theta_2 = +10$ degrees, the fast axis orientation of birefringent crystal element halves 129 and 130. The orientation angles of these components are also listed in Table 3. Tuning of this filter is achieved by rotating contiguous groups of disks 124 through an angle of $\Delta$ while synchronously rotating contiguous group of disks 125 through an angle 4 $\Delta$ as described in U.S. Pat. No. 4,678,287 for the prior art configuration of FIG. 11a.

Figure 12:
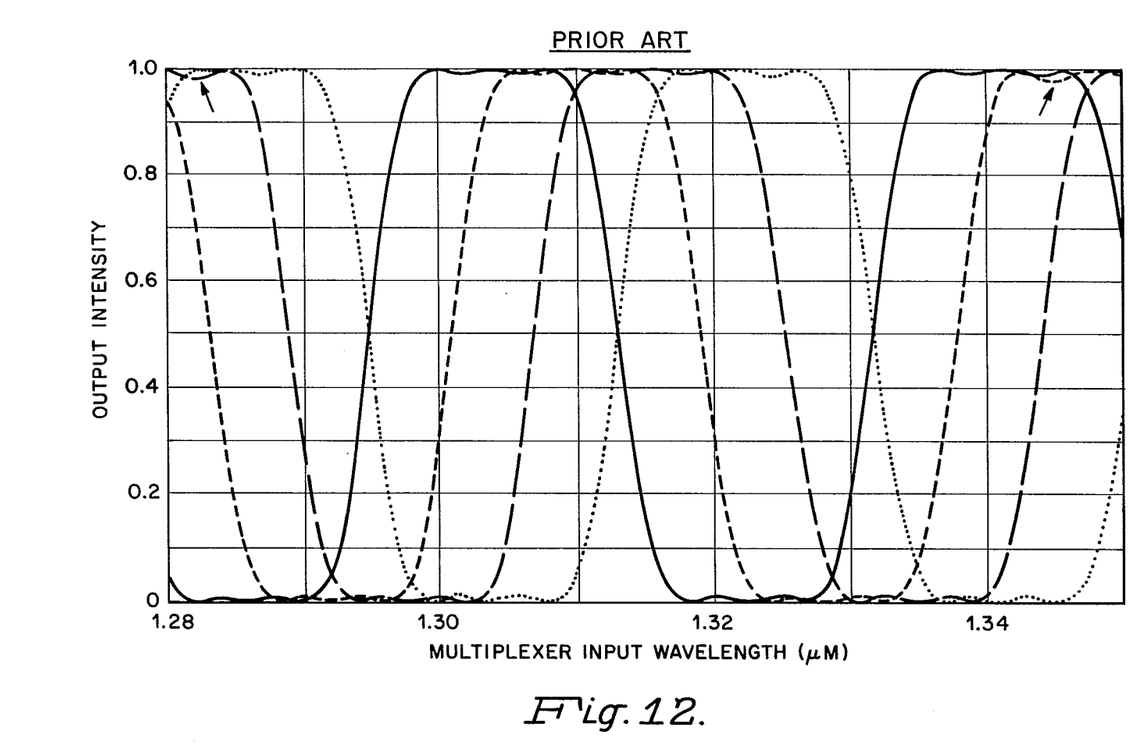
FIG. 12 is a chart of transmission characteristics using quartz disks retardation plates as in the prior art.
Figure 13:
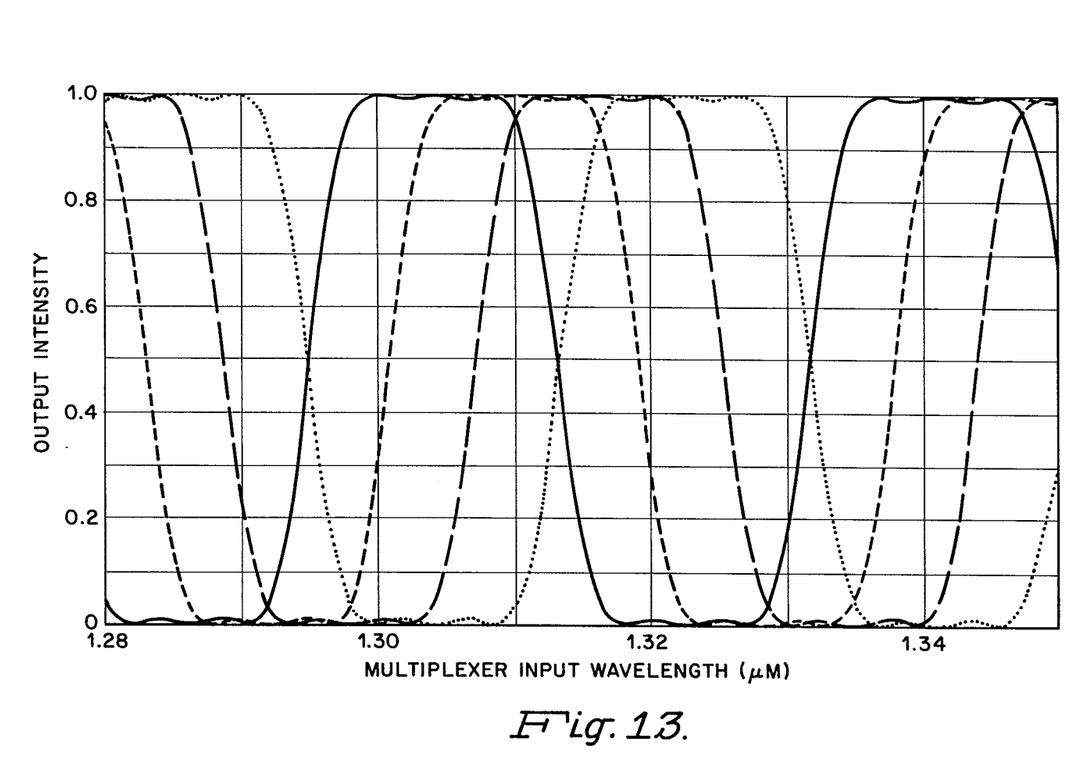
FIG. 13 is a transmission characteristics chart, in accordance with the present invention, in which achromatic combinations of high order retardation disks are utilized, in according to the present invention.

The ideal transmission characteristics given therein are now recomputed for the practical implementations of the filters of FIGS. 11a and 11b and are shown in FIGS. 12 and 13, respectively. In FIG. 12, the retardation plates are considered to be quartz disks with $n=1$ or $m=2$ times the quarter-wave thickness t as defined above. They correspond, therefore, to first order quarter- and half-wave plates, respectively. The curves show, at the wavelength extremes, some deviation from the ideal shape near the center wavelength of 1.315 microns. In FIG. 13, the retardation plates are replaced as shown in FIG. 11b by achromatic combinations of high order retardation disks according to the present invention. The transmission characteristic of this filter, maintains its ideal shape out to the wavelength extremes plotted.

TABLE 3

Orientation Angles of Filter Components

| Birefringent Filter of FIG. 11a | | | Birefringent Filter of FIG. 11b | | |
|---|---|---|---|---|---|
| Polarizer | 102 | 0 deg. | Polarizer | 122 | 0 deg. |
| Quarter-Wave Plate | 111 | 90 | Even Order Disk | 131 | $+90 - b + a$ |
| | | | Odd Order Disk | 132 | $+90 - b$ |
| Half-wave Plate | 112 | $\Delta$ | Odd Order Disk | 133 | $\Delta + 0 - b$ |
| | | | Even Order Disk | 134 | $\Delta + 0 - b + a$ |
| | | | Even Order Disk | 136 | $\Delta + 0 - b + a$ |
| | | | Odd Order Disk | 137 | $\Delta + 0 - b$ |
| Quarter-Wave Plate | 113 | 90 | Odd Order Disk | 138 | $+90 - b$ |
| | | | Even Order Disk | 139 | $+90 - b + a$ |
| Crystal Element | 106 | 45 | Crystal Element | 126 | $+45$ |
| Crystal Element | 107 | $-15$ | Crystal Element | 127 | $-15$ |
| Crystal Element | 108 | $-15$ | Crystal Element | 128 | $-15$ |
| Quarter-Wave Plate | 114 | 30 | Even Order Disk | 141 | $+30 - b + a$ |
| | | | Odd Order Disk | 142 | $+30 - b$ |
| Quarter-Wave Plate | 115 | $-60 + 4\Delta$ | Odd Order Disk | 143 | $4\Delta - 60 - b$ |
| | | | Even Order Disk | 144 | $4\Delta - 60 - b + a$ |
| Quarter-Wave Plate | 116 | $-35 + 4\Delta$ | Even Order Disk | 146 | $4\Delta - 35 - b + a$ |
| | | | Odd Order Disk | 147 | $4\Delta - 35 - b$ |
| Quarter-Wave Plate | 117 | 55 | Odd Order Disk | 148 | $+55 - b$ |
| | | | Even Order Disk | 149 | $+55 - b + a$ |
| Crystal Element | 109 | 10 | Crystal Element | 129 | $+10$ |
| Crystal Element | 110 | 10 | Crystal Element | 130 | $+10$ |

TABLE 3-continued

| Orientation Angles of Filter Components | | | |
|---|---|---|---|
| Birefringent Filter of FIG. 11a | | Birefringent Filter of FIG. 11b | |
| Polarizer | 103  0 | Polarizer | 123  0 deg. |

The construction of achromatic quarter-wave combination plates directly from high order retardation disks is believed to be new. The combining of two of these combination plates in two different ways to obtain a complementary pair of achromatic two plate tuners useful for tuning birefringent filters is also believed to be new. Various modifications will suggest themselves to those skilled in the art without departing from the spirit and scope of the appended claims.

What is claimed is:

1. A birefringent retardation plate having a quarter wave of linear optical birefringence over a wavelength range centered about a nominal wavelength comprising
a combination of two birefringent optical disks in adjacent positions along a light beam axis, each of said disks having a linear optical birefringence with a respective fast axis,
one of said birefringent optical disks having a thickness such that, at said nominal wavelength, said one disk has its linear optical birefringence at n quarter waves of said nominal wavelength, wherein n is an odd integer greater than one,
the other of said birefringent optical disks having a thickness such that, at said nominal wavelength, said other disk has its linear optical birefringence at m quarter waves of said nominal wavelength, wherein m is an even integer greater than n,
said fast axes of said linear birefringences of said disks having rotational orientations about said light beam axis such that orientation of said fast axis of said other disk differs from orientation of said fast axis of said one disk by ninety degrees plus or minus one-half of the angle whose cosine is equal to the ratio of n to m.

2. The birefringent retardation plate as recited in claim 1 characterized in having a wavelength dependent rotation effect.

3. A two plate tuner achromatic over a wavelength range centered about a nominal wavelength comprising
first and second achromatic quarter-wave composite plates for providing a variable linear birefringent effect in response to angular orientation of said second plate relative to angular orientation of said first plate about a light beam axis,
said first plate comprising a combination of first and second birefringent optical disks, and said second plate comprising a combination of third and fourth birefringent optical disks, said plates being in serially adjacent positions along said light beam axis,
said second and third disks having a thickness such that, at said nominal wavelength, said second and third disks have linear optical birefringence at n quarter waves of said nominal wavelength, wherein n is an odd integer greater than one,
said first and fourth disks having a thickness such that, at said nominal wavelength, said first and fourth disks have linear optical birefringences at m quarter waves of said nominal wavelength, wherein m is a even integer greater than n, and
each of said disks having a respective linear optical birefringence with a respective fast axis,
said fast axes of said linear optical birefringence of said first, second, third, and fourth disks having rotational orientation about said light beam axis such that said fast axis orientations of said first and fourth disks differ from said fast axis orientations of said second and third disks, respectively, by a constant angle equal to ninety degrees plus or minus one-half of the angle whose cosine is equal to the ratio of n to m.

* * * * *